W. W. Riley,
Artificial Teeth.
N° 8,533.    Patented Nov. 18, 1851.
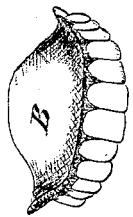
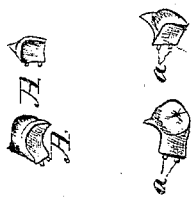 

UNITED STATES PATENT OFFICE.

WM. WILLSHIRE RILEY, OF COLUMBUS, OHIO.

INSERTING PORCELAIN TEETH.

Specification of Letters Patent No. 8,533, dated November 18, 1851.

*To all whom it may concern:*

Be it known that I, WILLIAM WILLSHIRE RILEY, of the city of Columbus, in the county of Franklin and State of Ohio, have invented new and improved porcelain teeth and the mode of making them, to be used as substitutes for human teeth, which renders them natural in form and better adapted to the purposes for which they are intended than any now in use; and I do hereby declare that the following is a full and exact description.

The nature of my invention consists in so forming the base or plate surface of the teeth concave, that it can be readily fitted to the convex surface of the metallic base or gum plate to which they are to be attached, and in so placing the platina pins, *a* into the palatine surface of the tooth near the base, in an oblique direction that the projecting ends can be easily and firmly soldered to the gum plate without the labor and expense of lining the backs of the teeth with gold stays, thereby saving nearly all the labor, and much of the expense of setting them, while by reason of their concave base they have a more firm support to resist perpendicular and lateral pressure in the act of mastication, without endangering the pins.

To enable others skilled in the art to make and use my invention, I will proceed to describe its construction and operation.

I construct my molds of brass or any metallic substance or compound suitable for the purpose. I take casts of natural human teeth from which I shape exact patterns of the various teeth required of brass or other metallic compounds, and over these pattern teeth I cast my molds in two halves, so that by putting the porcelain, composed in the usual manner into them and bringing them together, the teeth are brought into shape, when the pins made in the usual form, only much longer, are inserted through an opening in the back of the mold made for the purpose the teeth are molded into such a form, that the concave base A will fit over the convex surface of the gum plate, B, to which they are to be attached by soldering the projecting ends of the platina pins to it. Thus replacing the important organs of mastication with incorruptible substitutes having the perfect forms of the originals from which they are taken, and at the same time giving them much greater strength and grinding surface and a saving amounting to one-half the cost of setting them for use upon the gum plate, from which they appear as if they had grown having no linings to betray the presence of artificial teeth, so often the case with those now in use even should the external forms of them resemble nature which is seldom the case on account of their flatness and not being taken from nature.

What I claim as my invention and desire to secure by Letters Patent is—

The mode of inserting teeth by forming the concave base and of inserting the platina pins into the base of the palatine surface of the teeth in an oblique direction, and attaching them to the gum plate without stays.

W. WILLSHIRE RILEY.

Witnesses:
   JNO. W. HAMILTON,
   WM. R. THRALL.